UNITED STATES PATENT OFFICE.

REMO CATANI, OF ROME, ITALY.

PROCESS FOR PRODUCING CARBIDS.

No. 918,419.    Specification of Letters Patent.    Patented April 13, 1909.

Application filed January 15, 1906. Serial No. 296,210.

*To all whom it may concern:*

Be it known that I, REMO CATANI, subject of the King of Italy, residing at Rome, Italy, have invented new and useful Improvements in Processes for Producing Carbids, of which the following is a specification.

In the electric furnaces, refractory materials, as oxids, are melted with carbon in order to obtain the pure metal or the carbid of the metal, and the like. The oxid is separated into its elements; metal and oxygen, by the action of the electricity in the hottest part of the furnace and till it has reached this part it is not altered; carbon, on the contrary, in the high temperature of the furnace is transformed partially into carbon monoxid and dioxid before reacting on the metallic compound and when the metal is detached from oxygen another part of carbon is wasted. The cost of carbon is the greatest part of the entire cost of the product and it is very useful to reduce the consumption of carbon. In order to attain this object, I employ the carbon of the charge coated with a mixture of refractory material which is different for the different products to be obtained from the electro-metallurgical operations, and I only employ the quantity of carbon strictly necessary for the formation of the product as already stated.

Operating in the common way, a mixture of carbon (metallurgic coke, anthracite, retort coke or any other kind of carbon) with a metal oxid (oxid of silicon or of the earth alkaline metals etc.) is placed in the furnace, the metallurgical reactions take place in the following order: 1. Separation of oxid (lime CaO is separated in Ca and O). 2. Combination in the zone of the highest temperature of the metal with a part of the carbon of the mixture for forming the carbid of the metal (carbid of calcium $CaC_2$, carbid of silicon SiC). 3. Combination of the oxygen from the metal oxid with another part of the carbon of the mixture for forming carbon monoxid in the less hot zone of the furnace. Now this patent application does not refer to "the electrolysis of calcium oxid" but interprets the well known formula

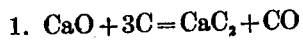

1. $CaO + 3C = CaC_2 + CO$ in a very different manner, namely that the separation of the oxid must take place according to the other formula

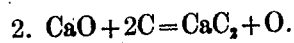

2. $CaO + 2C = CaC_2 + O$.

This reaction takes place only by thermal effect either by alternating or by direct current independently therefore of electrolytic phenomena. It is possible however that the electrolysis takes place by direct current because some facts observed in the manufacture of carbid by means of direct and alternating current would induce to believe that the electrolysis of calcium oxid CaO is more easily effected by direct than by alternating current.

The applicant proposes to demonstrate: *a.* That the reaction 2 is possible. *b.* That the reaction 2 is more probable than the reaction 1.

A. The energy required to separate 56 kg. of calcium oxid is 131,500 calories (cf. Joseph W. Richards *Metallurgical Calculations* New York, McGraw Publishing Co., 1906, page 15): the energy required to produce 64 kg. of carbid is 6250 calories (see same page 21); the smelting heat of limestone is 6873 calories—total 144,623 calories. To this amount of heat must be added the calories required to heat 56 kg. of limestone and 24 kg. of coal from 0° to 3000°—melting temperature of limestone. (Moissan *Electric Furnace* translated by A. T. de Monilpied, London, Adward Arnold 1904 page 204). These quantities are respectively 40,572 and 28,697 calories reckoned following the most recent data for the specific heats of lime and coal (J. W. Richards *id.*, pages 62 and 98). However only a part of this energy $$40,572 + 28,697 = 69,269$$

must be added to the heat of chemical combination as the productions of the reaction yield calories and heat the mixture: we will retain ⅔, thus the whole energy is 144,623 + ⅔ 69,269 = 190,803 corresponding to a production of about 7 kg. of carbid per kw.-day. This datum accords very well with the practical results (Keller, *Etude sur les Variations de Rendement du Carbure de Calcium III Congres International de l'Acetylene* page 193).

B. At the highest temperatures between 2800° and 3000° the following facts are to be observed.

1. Calcium oxid is very fixed as it may be proved by its reducive qualities (*cf.* Delepine, *Les Carbures Metalliques* A. Joanin, Paris, 24 Rue de Conde 1904 page 54) even with regard to highly refractory substances as alumina (*cf.* Moissan *Electric Furnace* 1904 page 219). It is not possible therefore that calcium oxid be dissociated to give place to carbonous oxid less fixed at lower temperatures (*cf.* Berthelot). Moreover carbid retains so firmly a part of its carbon and yields the other part at so high a temperature as not to allow the formation of carbonous oxid. In fact "Calcium carbid burns in oxygen at a dull red heat, forming calcium carbonate" (*cf.* Moissan *id.* page 208).

2. Calcium has a great affinity for carbon. Moissan established that lime melts at about 3000° independently from, and even in the absence of, carbon and that carbid is formed at about 3500° as soon as carbon comes into contact with molten lime and the temperature is raised (Moissan *Electric Furnaces id.* page 287). Maquenne has obtained carbid by heating calcium carbonate, magnesium and coal (1893 *Ann. Chem. et Phys.* 28 page 287). Carbon oxid cannot exist on account of the high temperature and of the action of the current. Berthelot (*Annales de Chimie et de Physique* 7me Serie t. XVI p. 21 1899) has demonstrated that under the influence of electricity carbonous oxid is thus transformed:

$$5CO = C_4O_3 + CO_2$$

and this suboxid is solid, brown colored and amorphous, soluble in water and absolute alcohol, insoluble in ether. This oxid is formed in electric furnaces but never in the hotter zone of same *i. e.* in the active zone where therefore it is impossible for carbonous oxid to be formed. The reaction $$CaO + 3C = CaC_2 + CO$$

is reversible as has been demonstrated by Frank and Caro's recent discoveries. Lime melts at a temperature lower than that required for the formation of carbid and in this interval it is not reduced notwithstanding the saturation of the surrounding carbon. Calcium is transformed into carbid only when in reaction with carbon (Keller *Etude sur les Variations de Rendement du Carbure de Calcium* IIIme *Congres International de l'Acetylene tenu à Paris du 22 and 28 Septembre 1900*, page 193.) Gin in one of his monographs (*Zeitschrift Elektro Chemie* Vol. VIII page 397) has given the following further arguments to prove that the reaction between CaO and C in order to produce carbid be this $$CaO + 2C = CaC_2 + O$$

rather than the other which is more commonly known. It corresponds better to the practical proportions employed in industry. The remarkable consumption of electrodes is owing to oxygen which is produced in the furnace, instead to the surrounding air, because the pressure caused by the reaction in the hotter zone prevents the surrounding air from coming in. The said carbon oxid is totally or partially transformed into carbon dioxid if the furnace presents comparatively cool zones and in contact with the air or other oxidizing medium (open furnaces); or remains unchanged if the furnace is entirely at high temperature and excluded from the action of air or other oxidizing medium (closed furnaces). For the carbids the quantity of carbon of the mixture is therefore the sum of the carbon necessary for the formation of the carbid of the metal introduced in the furnace in the condition of oxid, and of the carbon necessary for saturating the oxygen from the separated oxid. If the oxygen can escape from the furnace as soon as it is formed or if the carbon is coated with a suitable refractory material so as to be protected from the action of the oxygen, the quantity of carbon to be introduced in the electric furnace is reduced to that necessary to the formation of carbid.

My process consists in first coating the carbon of the mixture with a refractory material, second putting into the mixture only the carbon necessary for the formation of carbid, and third using such refractory material, that while protecting the carbon until it is out of the zone of the highest temperature (zone of electro-thermo-chemical reaction) it does not alter the purity of the product obtained. This refractory material may be slaked lime in the case of calcium carbid, silica or silicates in the case of carborundum, etc. In performing my process the mixture is placed preferably in an electric furnace, but it may be placed in any other furnace capable of producing high temperatures. The process has also the advantage of rendering the mixture insulating, thus preventing the current from being uselessly and sometimes deleteriously wasted in the furnace. If a metal in lieu of being in the condition of oxid, is introduced into the furnace in the condition of carbonate, the latter is reduced to oxid before reaching the zone of reaction, and the process remains unaltered.

Applying my process to the production of calcium carbid a mixture of 24 parts by weight of carbon coated with slaked lime, and 56 parts by weight of calcium oxid, there is 43 parts of carbon to 100 parts of lime introduced into the furnace. This quantity of carbon to be mixed with lime corresponds to the chemical equation $$CaO + 2C = CaC_2 + O.$$

Heretofore the chemical reaction was believed to be $$CaO + 3C = CaC_2 + CO.$$

My researches have demonstrated that the reactions take place in the following order—

$$2CaO + 4C = 2CaC_2 + O_2;$$
$$O_2 + 2C = 2CO;$$
$$2CO + O_2 = 2CO_2.$$

It is true that oxygen, carbon monoxid, and dioxid escape from the electric furnace. The first reaction takes place in the hottest part of the electrical furnace, the second in a less hot part and the third in a still less hot part. When the carbon of the mixture is coated with slaked lime, the second and third reaction cannot take place, and the mixture ought to be calculated from the first chemical equation.

Applying my process to the production of carborundum, the mixture ought to be calculated according to the equation $$SiO_2 + C = SiC + O_2.$$

My invention relates also to the direct process to make cyanamid salts by means of carbon, lime and nitrogen. In this case placing in the mixture the carbon coated with slaked lime, the weight of the carbon is one half of the weight of carbon necessary to make calcium cyanamid according to the known process such as is described in U. S. Patent No. 757,185 April 14, 1904. The weight of carbon to place in the mixture accordingly with my process is as the following equation $$CaO + C + N_2 = CaCN_2 + O.$$

And in this way oxygen is generated in the furnace.

If the furnace is without electrodes or with electrodes of a substance not capable of being attacked by oxygen, the process may be applied directly, whereas when the electrodes are apt to be attacked by oxygen, they are coated with the same refractory material used for coating the carbon of the mixture, or an outlet is formed for the oxygen, keeping the tapping hole of melting furnaces open. The powerful pressure existing in the crucible of the furnace permits the oxygen to escape rapidly as soon as the outlet is opened, which may also be facilitated by suction.

Having now fully described my invention and the manner in which the same is to be performed, I declare that what I claim is:

1. The process of making carbid compounds consisting in coating carbon with a compound containing part of the element that is to form the carbid, and placing such coated carbon in an electric furnace and also placing in the furnace the element to form the carbid, the electrodes in the furnace being coated with the same compound.

2. The process of making carbid compounds consisting in coating the carbon with a compound containing part of the element that is to combine with the compound to form the carbid, such compound also containing oxygen, placing such coated carbon into an electric furnace and also placing in the furnace the said element to combine with the carbon to form the carbid, the electrodes in the furnace being coated with the same compound.

3. The process of making calcium carbid compounds consisting in coating the carbon with a refractory material, and placing such carbon and also lime in an electric furnace.

4. The process of making calcium carbid compounds consisting in coating the carbon with slaked lime and placing such coated carbon and also slaked lime into an electric furnace.

5. The process of making calcium carbid compounds consisting in coating the carbon with slaked lime and placing such coated carbon and also slaked lime into an electric furnace, the electrodes in the furnace being also coated with slaked lime.

6. The process of making calcium carbid compounds consisting in coating the carbon with a refractory material, and placing such carbon and also lime into an electric furnace, the amount of carbon admitted being only sufficient to entirely combine with the calcium to form the carbid compound.

7. The process of making calcium carbid compounds consisting in coating the carbon with slaked lime and placing such coated carbon and also slaked lime into an electric furnace, the electrodes in the furnace being also coated with slaked lime, the amount of carbon admitted being only sufficient to entirely combine with the calcium to form the carbid compound.

In testimony whereof I have signed my name to this specification in the presence of two subscribing witnesses.

REMO CATANI.

Witnesses:
 A. RAZG,
 PIO RINALDINI.